E. A. LEONARD.
TROLLEY HARP.
APPLICATION FILED JUNE 1, 1916.

1,213,890.

Patented Jan. 30, 1917.
2 SHEETS—SHEET 1.

WITNESSES

INVENTOR
Ethan A. Leonard.
BY
ATTORNEY

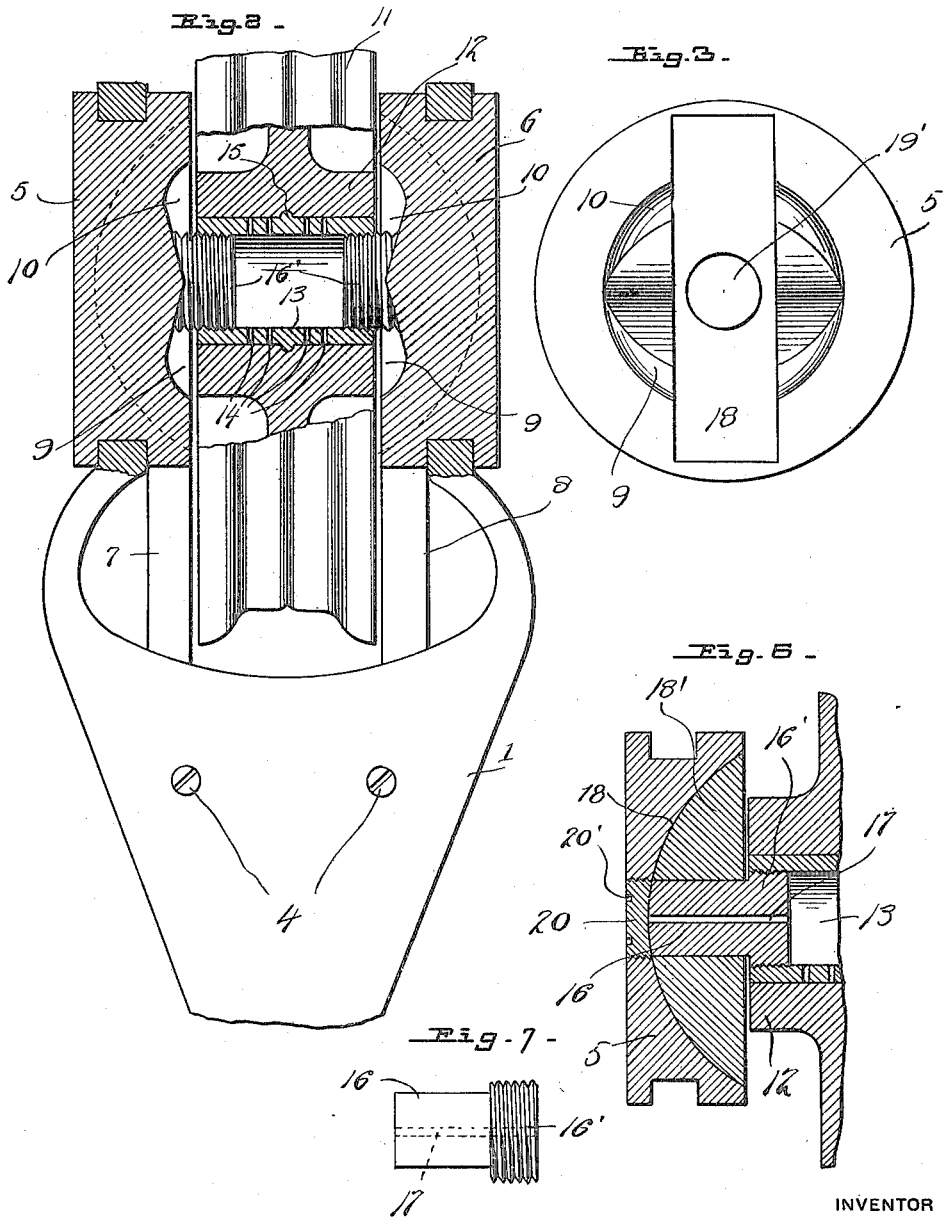

UNITED STATES PATENT OFFICE.

ETHAN A. LEONARD, OF AURORA, ILLINOIS.

TROLLEY-HARP.

1,213,890.

Specification of Letters Patent.

Patented Jan. 30, 1917.

Application filed June 1, 1916. Serial No. 101,130.

*To all whom it may concern:*

Be it known that I, ETHAN A. LEONARD, a citizen of the United States, residing at Aurora, in the county of Kane and State of Illinois, have invented certain new and useful Improvements in Trolley-Harps, of which the following is a specification.

This invention relates broadly to electricity transmission to vehicles, and more particularly, to an improved trolley harp.

More explicity set forth, the present invention aims to provide an improved device of the character stated, whereby the trolley wheel will be permitted sufficient play to compensate for any irregularities occurring in the trolley wires and also, whereby the trolley wheel will be permitted to turn upon its bearing when the same encounters a curve in the trolley wires.

Another important characteristic of the present invention resides in the novel construction of the means whereby the trolley wheel may be supplied with lubricants.

The annexed drawings and the following description set forth in detail, certain mechanism embodying the invention, such disclosed means constituting, however, but one of the various mechanical forms in which the principle of the invention may be used.

Figure 1:
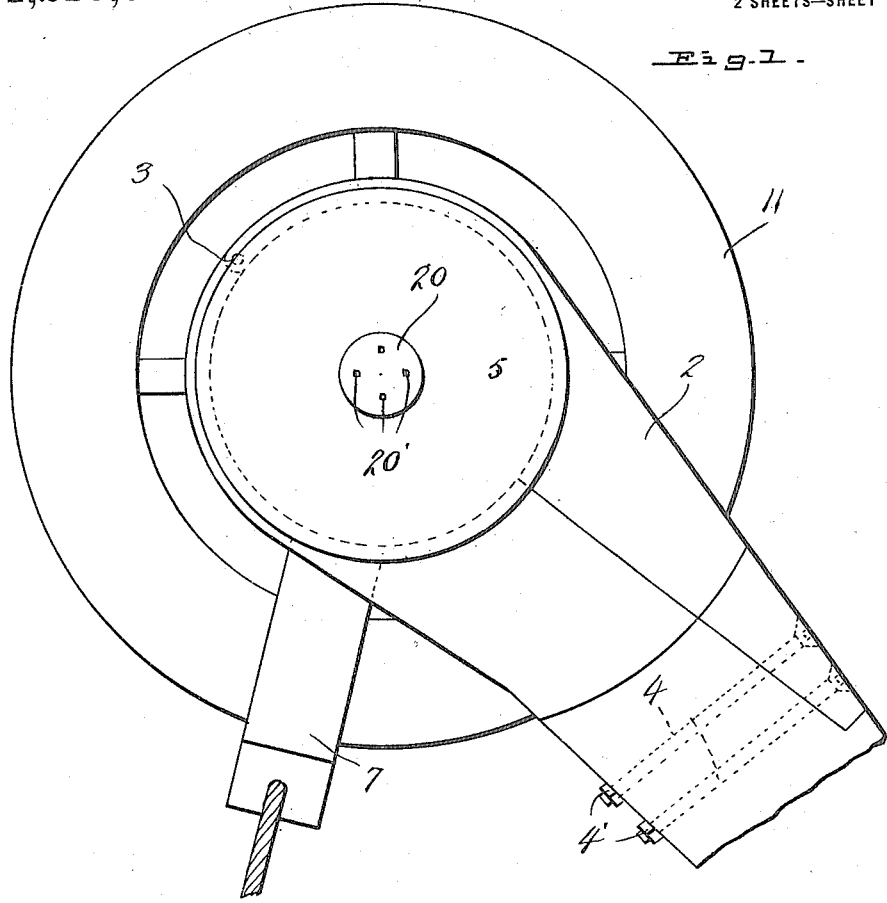
Figure 4:
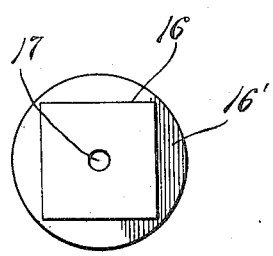
Figure 5:
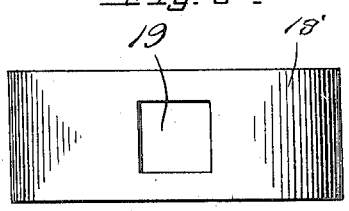

In said annexed drawings:—Figure 1 is a side elevation of my improved harp; Fig. 2 is a fragmental view thereof partly in transverse section; Fig. 3 is a side elevation of one of the supporting bearings for the trolley wheel, looking toward its inner face; Fig. 4 is a front elevation of one of the trolley wheel supporting elements; Fig. 5 is a front elevation of one of the movable bearings as used in conjunction with the trolley harp; and Fig. 6 is a fragmental vertical section in detail showing the mounting of one of the movable bearings. Fig. 7 is a detail in side elevation of one of the trolley wheel supporting elements.

Referring now more particularly to the drawings, wherein like reference characters designate corresponding parts throughout the several views, I provide a trolley wheel supporting member, designated in its entirety as at 1, which comprises an immovable section and a movable section 2, the said movable section being hingedly connected to the immovable section as at 3 and engages with the immovable section by means of the cutaway portion, which forms an efficient seat therefor. Bolts generally numbered 4 are passed through the adjoining sections and have nuts 4' turned into engagement with their threaded extremities, thus, securely holding the sections together. These movable and immovable sections are so formed as to constitute brackets or receiving and supporting circular bearings 5 and 6, the bearings having arranged thereabout grooves whereby the encircling brackets may be received. In order that the bearings 5 and 6 may be held against rotation in their respective brackets, the same are snugly fitted thereinto, through the medium of the annular grooves as arranged about their peripheries. Arms 7 and 8 are formed upon the lower portions of the bearings 5 and 6 and are provided with, adjacent their lower extremities. suitable openings, whereby the usual trolley rope may be connected therewith, in order, that the wheel may be removed from the trolley wire, when so desired. Pockets 9 and 10 are formed in each of the bearings 5 and 6, for a purpose as will be hereinafter described. A trolley wheel 11 having a hub 12 is supported upon a hollow axle 13, which axle, is provided with a plurality of perforations or ways 14, whereby lubricants may be applied to the bearing surface of the hub 12. To prevent lateral movement of the trolley wheel 11 relative to its axle 13, I arrange upon its bearing face, an annular groove adapted to receive a complemental beading 15 carried by the hollow axle 13. The outer extremities of the axle 13 are screw threaded and have turned into engagement therewith, the enlarged circular head 16' of the squared trolley wheel supporting element 16. A longitudinally extending bore 17 is arranged centrally of the element 16 and serves to provide means whereby lubricants may be passed therethrough into the hollow axle 13. Concaved seats 18 are arranged in the bearings 5 and 6 and receive convex bearing members 18', which members are provided with squared openings 19, thus, permitting the introduction of the squared end of the supporting element 16 thereinto. Annular openings 19' are arranged in the bearings 5 and 6 substantially centrally of the concaved seats 18 and are interiorly threaded. whereby plugs 20 may be turned into engagement therewith, suitable sockets or seats 20' may be formed in the said plugs to facilitate engagement with a turning wrench.

In reduction to practice, it will be apparent, that when the trolley wheel 11 encounters any irregularity in the trolley wires, such as a curve or the like and the trolley pole is accordingly moved at an angle thereto, the trolley wheel 11 will, due to its mounting upon the concaved bearing seats 18, be permitted to compensate for the curve. It will be also noted, that should the trolley be moved out of alinement with the trolley wire, the wheel will be permitted to turn upon its bearing and thus, prevent its jumping the wire.

When it is desired to supply the hollow axle 13 with lubricants, the plug 20 may be removed by a suitable wrench and lubricant passed through the ways 16 thereinto. As needed, the lubricant will flow through the various perforations 14 as formed in the axle 13 onto the bearing surfaces of the hub.

Other modes of applying the principle of my invention may be employed instead of the one explained, change being made as regards the mechanism herein disclosed, provided the means stated by any of the following claims or the equivalent of such stated means, be employed.

I, therefore, particularly point out and distinctly claim as my invention:—

1. A trolley harp, including a supporting member, circular bearing plates removably carried by said supporting member having concaved pockets arranged therein, supporting elements movably received by said concaved bearing elements, and a trolley wheel arranged upon said supporting elements.

2. A trolley harp, including a supporting member, bearings carried by said supporting member having concaved pockets arranged therein, supporting elements movably arranged in said pockets, immovable stub-axles arranged upon the supporting elements, and a trolley wheel carried by said stub-axles.

3. A trolley harp, including a supporting member, bearings carried by said supporting member having concaved pockets arranged therein, convex supporting elements removably received by said pockets, stub-axles having squared extensions engaged with said supporting elements, and a trolley wheel carried by the stub-axles.

4. A trolley harp, including a supporting member, bearings carried by said supporting member having concaved pockets and inclined recesses adjacent the pockets formed therein, convex supporting elements movably received by said pockets, and a trolley wheel arranged upon the supporting elements.

5. A trolley harp, including a supporting member, circular bearing plates carried by said supporting member having concaved pockets arranged therein, supporting elements loosely received by said bearing pockets, stub-axles engaged with the supporting elements, a hollow axle arranged upon said stub-axles having a plurality of lubricant dispensing ways therein, and a trolley wheel carried by the axle.

6. A trolley harp, including a supporting member, annular bearing members carried by said supporting member having concaved pockets and inclined recesses adjacent the pockets therein, convex bearing members loosely received by said pockets, supporting elements carried by the convex bearing members, a hollow axle engageable with said supporting elements and provided with a plurality of lubricant dispensing ways, and a trolley wheel carried by the axle.

7. A trolley harp, including a supporting member, annular bearings carried by said supporting member having concaved pockets and inclined recesses adjacent the pockets formed therein, convex bearing members receivable by said pockets and movable therein, supporting elements carried by said convex bearing members, a hollow axle engageable with said supporting members and provided with a plurality of lubricant dispensing ways, a trolley wheel arranged upon the axle, and depending arms formed upon said annular bearings for facilitating the connecting of a trolley rope thereto.

8. A trolley harp, including a supporting member, annular bearings removably carried by said supporting member having concaved pockets and inclined recesses adjacent the pockets arranged therein and having stoppered openings for receiving lubricant, convex bearing members received by the pockets and movable therein, supporting elements engageable with said convex bearing members and having lubricant channels communicating with openings, a hollow axle carried by said supporting elements and provided with a plurality of lubricant dispensing ways, a trolley wheel arranged upon the axle, and depending arms formed upon the lower portions of the annular bearings for facilitating the connecting of a trolley rope thereto.

In testimony whereof I affix my signature in presence of two witnesses.

ETHAN A. LEONARD.

Witnesses:
GEORGE W. ESSER,
MYRON J. DAVIS.

Copies of this patent may be obtained for five cents each, by addressing the "Commissioner of Patents, Washington, D. C."